(No Model.)
H. D. VAN CAMPEN.
BLASTING OUT STUMPS.
No. 270,351. Patented Jan. 9, 1883.
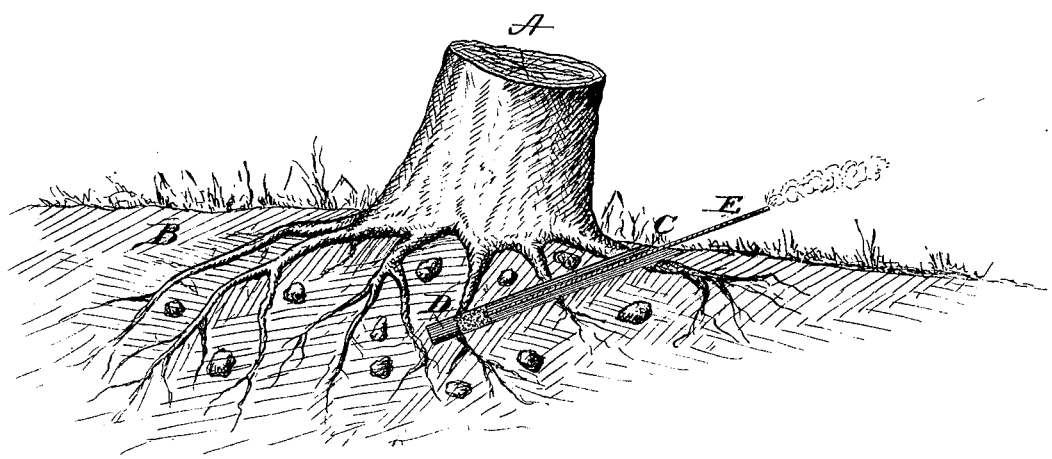
WITNESSES
Franck L. Ouraud
C. J. Williamson
INVENTOR
Harry D. Van Campen
By J. W. Robertson
Attorney

UNITED STATES PATENT OFFICE.

HARRY D. VAN CAMPEN, OF BELMONT, NEW YORK.

BLASTING OUT STUMPS.

SPECIFICATION forming part of Letters Patent No. 270,351, dated January 9, 1883.

Application filed August 14, 1882. (No model.)

*To all whom it may concern:*

Be it known that I, HARRY D. VAN CAMPEN, a citizen of the United States of America, residing at Belmont, in the county of Allegany and State of New York, have invented certain new and useful Improvements in Methods of Extracting Stumps, of which the following is a specification, reference being had therein to the accompanying drawings.

My invention relates to an improved method of extracting stumps; and it consists more particularly in the arrangement of the explosive so below the stump as to leave a cushion of earth below it, as will be more fully hereinafter described and claimed.

In the accompanying drawing, which represents a vertical section of a stump and the earth, &c., around it, A indicates the stump; B, the earth; and C, the hole made in the earth to receive the cartridge D, which is provided with a fuse, E, by which it is discharged.

In removing stumps by my method I take a pointed iron bar of the size I desire my hole to be, and drive said bar into the earth slantingly under the stump A, at about the angle represented in the drawing, until a chamber, C, is formed for the reception of the cartridge D under the center of the stump, and from eight to sixteen inches beneath the bottom of the stump, so as to leave a large body of earth between the cartridge and the stump.

The cartridge I prefer to use is filled with a composition for which I am about to make application for a patent, which compound consists of carbonized bark, dextrine, cryolite, potassium nitrate, and vitroleum or nitro-glycerine; but said composition is not claimed in this application. To fire said cartridge, a percussion-cap is inclosed in it, and one end of a fuse, E, is inserted in said cap, leaving the other end above ground. After the cartridge has been properly placed the hole is tamped with any suitable material and the fuse lighted, by which means the cap is caused to explode the cartridge, and the effect is a very powerful explosion, which raises the whole mass of earth above it, carrying with it not only the stump, but the roots as well, which will be found to be loosened and raised clear of the ground for a long distance in every direction. I locate the cartridge at a depth of from eight to sixteen inches below the bottom of the stump, because under most circumstances I find that distance to be the best; but do not wish to limit myself to this exact location, as a good effect may be produced at greater or less distances; but there should always be a considerable body of earth between the cartridge and the stump, so as to form a cushion beneath the latter, which will cause the force of the explosion to be spread out, so as to act not only on the stump, but on the outlying roots as well, by which means the whole mass will be loosened, as before explained, whereas, as I have found by actual experiment and practice, if the cartridge is located immediately beneath the stump, the effect, owing to the sudden action of the explosive, is to split the stump and break off the roots, leaving the latter to be extracted subsequently, whereas by leaving a mass of earth between the cartridge and the stump the power of the explosive is diffused over a large space, and thus the roots and stump are not only loosened from the earth simultaneously, but the stump is left in an unbroken condition, which is a great object in some cases, especially where walnut stumps are being extracted, as the wood of such stumps is very valuable, and when split by an explosion it would loose a great part of its value.

I am aware that stumps have been bored into and explosives fired in said hole; but this does not accomplish the same purpose as my method, because if the hole is made in the tree or stump it is simply split by the explosive and the force of the explosion wasted in the open air; and although by such means some effect is produced in loosening the stump the effect is not near so good as with my process, as will be readily seen.

I do not limit myself to my particular explosive, as any suitable compound may be used.

I do not intend to be understood as claiming broadly the method of extracting stumps by blasting; but What I do claim is—

As an improvement in the art of extracting stumps, the method herein described of extracting the stump and its roots simultaneously, which consists in making a hole in the earth beneath the stump at a sufficient distance under it to leave a cushion of earth between the stump and the hole, then inserting in said hole an explosive, which is afterward tamped and fired, whereby the force of the explosion is diffused over a large surface and the stump and its roots pushed out of the ground by the cushion of earth, substantially as described.

In testimony whereof I affix my signature, in presence of two witnesses, this 14th day of August, 1882.

HARRY D. VAN CAMPEN.

Witnesses:
W. T. JOHNSON,
W. T. ROBERTSON.